(12) United States Patent
Barngrover et al.

(10) Patent No.: US 12,258,729 B2
(45) Date of Patent: Mar. 25, 2025

(54) SYSTEM AND METHOD FOR CONTROLLING A MOTOR DURING CLUTCH SHIFTING IN A MULTI-SPEED ELECTRIC DRIVETRAIN

(71) Applicant: Caterpillar Inc., Peoria, IL (US)

(72) Inventors: Michael J. Barngrover, Brimfield, IL (US); Brian E. Lister, Edwards, IL (US); Michael D. Beyer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 238 days.

(21) Appl. No.: 18/046,615

(22) Filed: Oct. 14, 2022

(65) Prior Publication Data

US 2024/0125088 A1 Apr. 18, 2024

(51) Int. Cl.
*E02F 9/20* (2006.01)

(52) U.S. Cl.
CPC ............. *E02F 9/202* (2013.01); *E02F 9/207* (2013.01)

(58) Field of Classification Search
CPC ...................................... E02F 9/202
See application file for complete search history.

(56) References Cited

U.S. PATENT DOCUMENTS

| | | | |
|---|---|---|---|
| 7,024,299 B2 | 4/2006 | Hubbard et al. | |
| 8,145,397 B2 | 3/2012 | Heap et al. | |
| 8,221,285 B2 | 7/2012 | Heap et al. | |
| 8,425,376 B2 | 4/2013 | Schoenek | |
| 9,062,763 B2 * | 6/2015 | Maloum | F16H 61/0437 |
| 9,457,787 B2 | 10/2016 | Nefcy et al. | |
| 9,802,607 B2 * | 10/2017 | Maloum | B60W 20/40 |
| 10,400,892 B2 * | 9/2019 | Karpenman | F16H 61/688 |
| 10,640,106 B2 | 5/2020 | Meyer et al. | |
| 10,900,374 B1 * | 1/2021 | Finke | H02P 9/06 |
| 11,242,062 B2 * | 2/2022 | Serrao | B60W 10/11 |
| 12,049,139 B2 * | 7/2024 | Baek | B60L 15/2054 |
| 2016/0288783 A1 | 10/2016 | Maloum | |
| 2021/0031774 A1 | 2/2021 | Serrao | |
| 2022/0169123 A1 | 6/2022 | Baek | |
| 2024/0125088 A1 * | 4/2024 | Barngrover | E02F 9/207 |
| 2024/0209935 A1 * | 6/2024 | Coenen | F16H 3/006 |

* cited by examiner

*Primary Examiner* — Michael A Berns (57) ABSTRACT

A system and method for controlling a motor of an electric drivetrain having a multi-speed transmission with at least a first clutch and a second clutch. The system and method includes initiating a transmission shift requiring engagement of the first clutch, applying synchronizing torque commands to the motor based on an engagement parameter of the first clutch until the shift is complete, and applying non-shifting torque commands to the motor after the shift is complete.

20 Claims, 5 Drawing Sheets

SYSTEM AND METHOD FOR CONTROLLING A MOTOR DURING CLUTCH SHIFTING IN A MULTI-SPEED ELECTRIC DRIVETRAIN

TECHNICAL FIELD

The present disclosure relates generally to a system and a method for controlling a motor of a multi-speed electric drivetrain, and, more particularly, to a system and a method for generating and applying synchronizing torque commands to the motor during clutch shifting in such a multi-speed electric drivetrain.

BACKGROUND

The use of electric drivetrains in mobile industrial machines, such as wheel loaders and motor graders, has increased due at least in part to the reduced drivetrain complexity and relatively greater ratio step size and control of electric traction motors as compared to combustion engines. Such electric drivetrains may thus provide for a relatively straightforward design with relatively greater torque output and control. However, during gear shifting of a multi-speed transmission of an electric drivetrain, the operation and control of clutches can be challenging due to the large inertia provided by the traction motors of the electric drivetrain. While frictional clutch elements may be used to absorb some of the high levels of inertia of the electric motor during gear shifting, the clutch elements are subject to operational constraints. For example, frictional clutch elements and their surrounding components may be subject to detrimental increased temperatures and wear when trying to speed up or slow down a traction motor during shifting.

U.S. Pat. No. 8,145,397 (the '397 patent) discusses a hybrid powertrain system having a transmission with four selectively engageable clutches controlled by a hydraulic control circuit. Controlling and managing an output torque of the transmission includes outputting motor torque commands to two electric machines of the hybrid powertrain system, to transfer a net output torque to an output member of the transmission that reacts with a driveline and meets an operator torque request. To effect damping of the driveline, torque offsets for the two electric machines may be determined by monitoring input speed to the transmission and clutch slip speeds of the clutches, and, more specifically, may be based on a difference between an input speed error (a difference between an input speed and an input speed profile) and a clutch slip speed error (a difference between a clutch slip speed and a targeted clutch slip speed). The targeted clutch slip speed and the clutch slip profile are used during a transition in the operating range state of the transmission to synchronize clutch slip speed prior to applying an oncoming clutch. The system of the '397 patent thus depends on clutch speeds and slip profiles to calculate motor torque commands.

There is a need, however, for improved control of the multi-speed transmission of an electric drivetrain particularly with respect to dissipation of high levels of motor inertia during gear shifting. The system and methods of the present disclosure may solve one or more of the problems set forth above and/or other problems in the art. The scope of the current disclosure, however, is defined by the attached claims, and not by the ability to solve any specific problem.

SUMMARY

In one aspect, a method for controlling a motor of an electric drivetrain having a multi-speed transmission with at least a first clutch and a second clutch is provided. The method includes initiating a transmission shift requiring engagement of the first clutch, applying synchronizing torque commands to the motor based on an engagement parameter of the first clutch until the shift is complete, and applying non-shifting torque commands to the motor after the shift is complete.

According to another aspect of disclosure, a method for controlling a mobile industrial machine having an electric drivetrain including a traction motor and a multi-speed transmission having at least a first clutch and a second clutch is provided. The method includes initiating a transmission shift requiring engagement of the first clutch, applying a motor torque command to a maximum available motor torque during partial engagement of the first clutch; and applying non-shifting torque commands to the motor after the shift is complete.

According to yet another aspect of the disclosure, a system for controlling a motor of an electric drivetrain having a multi-speed transmission is disclosed. The system includes the electric drive train having the multi-speed transmission with at least a first clutch and a second clutch. The system further includes a motor and a motor controller. The motor controller is configured to perform operations including applying synchronizing torque commands to the motor based on an engagement parameter of the first clutch during engagement of the first clutch, and applying non-shifting torque commands to the motor after a shift is complete.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. In addition, in this disclosure, relative terms, such as, for example, "about," "generally," "substantially," and "approximately" are used to indicate a possible variation of ±10% in the stated value.

Figure 1:
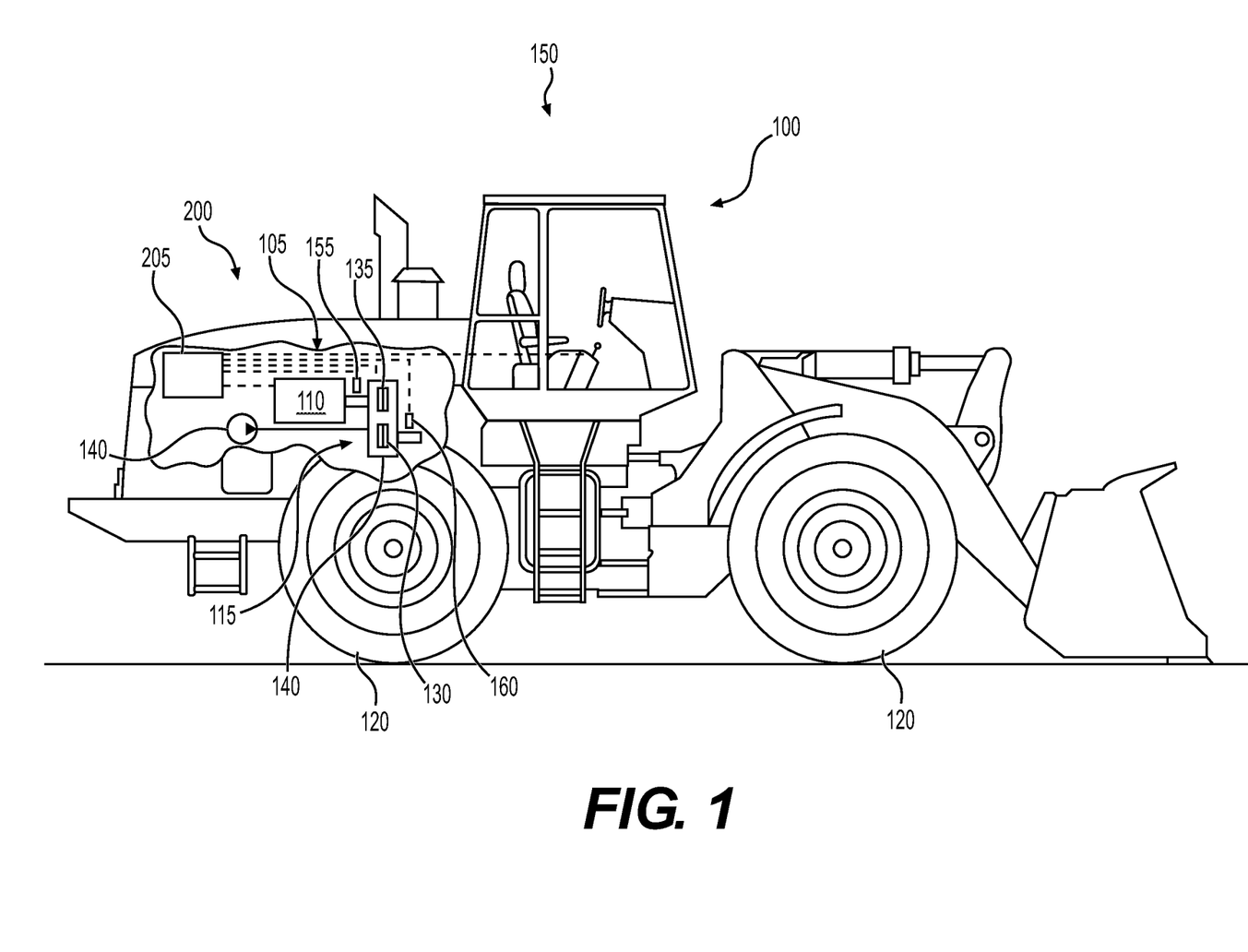
FIG. 1 shows a schematic view of a wheel loader, as an example of a machine including a multi-speed electric drivetrain and a motor controller, in which the systems and methods in accordance with the present disclosure may be used.

FIG. 1 shows a schematic view of a mobile industrial machine in the form of a wheel loader machine 100 in which the systems and methods of the present disclosure may be used. Although a wheel loader machine 100 is shown, other types of mobile industrial machines, such as tractors or motor graders, for example, may use the systems and methods described herein. The machine 100 may be an all-electric driven machine (driven only by a one or more traction motors), or a hybrid-electric machine. Machine 100 may include an electric drivetrain 105 including an electric traction motor 110, a multi-speed transmission 115, ground engaging elements, such as wheels 120, and a drivetrain control system 200. While the electric drivetrain 105 of machine 100 is shown with a single electric traction motor 110 and associated multi-speed transmission 115, it is understood that more electric motors and multi-speed transmissions could be used, such as one traction motor and transmission for each wheel 120. As will be described in more detail below, drivetrain control system 200 may receive various inputs and provide various outputs to electric drivetrain to provide motive power to the machine 100.

The electric traction motor 110 can be any type of appropriate electric motor sized to provide power, in the form of torque, to an input of the multi-speed transmission 115. The electric motor 110 may be powered by any appropriate energy source (not shown), such as one or more on-vehicle batteries, an electric grid, an on-vehicle engine driven generator, or a fuel cell. The electric traction motor 110 may have motor capability limits, including torque and speed limits, defined by continuous curves, intermittent curves, and/or peak curves in one or more look-up tables corresponding to the particular electric motor of the electric drivetrain system 105.

The multi-speed transmission 115 may receive input torque from motor 110 and provide output torque to one or more wheels 120 of the machine 100. The multi-speed transmission may be, for example, a two-speed transmission with appropriate gearing (not shown) and two hydraulic clutches 130, 135 in a gearbox 140. The hydraulic clutches 130 may be connected to a pressurized fluid, such as hydraulic system 140 of machine 100. While a two-speed transmission will be described herein, it is understood that a transmission of a greater number of speeds could be used, such as a three-speed or four-speed transmission. Each of the two clutches 130, 135 may be controlled to move between a fully engaged or "ON" condition, a partially engaged condition and a disengaged or "OFF" condition. In the fully engaged condition, respective clutch plates of a clutch 130, 135 are in mating contact and transfer full torque from the electric traction motor 110 through the multi-speed transmission 115. In the disengaged or "OFF" condition, respective clutch plates are spaced apart from one another and that particular clutch does not transfer torque from the electric traction motor 110 through the multi-speed transmission 115. Each clutch 130, 135 is configured to be engaged for a particular speed range of motor 110. Also, each clutch 130, 135 operates within operating parameters, such as an operating temperature limit or an operating pressure limit, both of which may be used to prevent overheating and damage or malfunction of the clutches 130, 135. When a clutch 130, 135 of the two or more clutches 130, 135 moves from the fully engaged condition to the disengaged condition, the clutch 130, 135 is referred to as an offgoing clutch, and when a clutch 130, 135 moves from the disengaged condition to the engaged condition, the clutch is referred to as an oncoming clutch.

Figure 2:
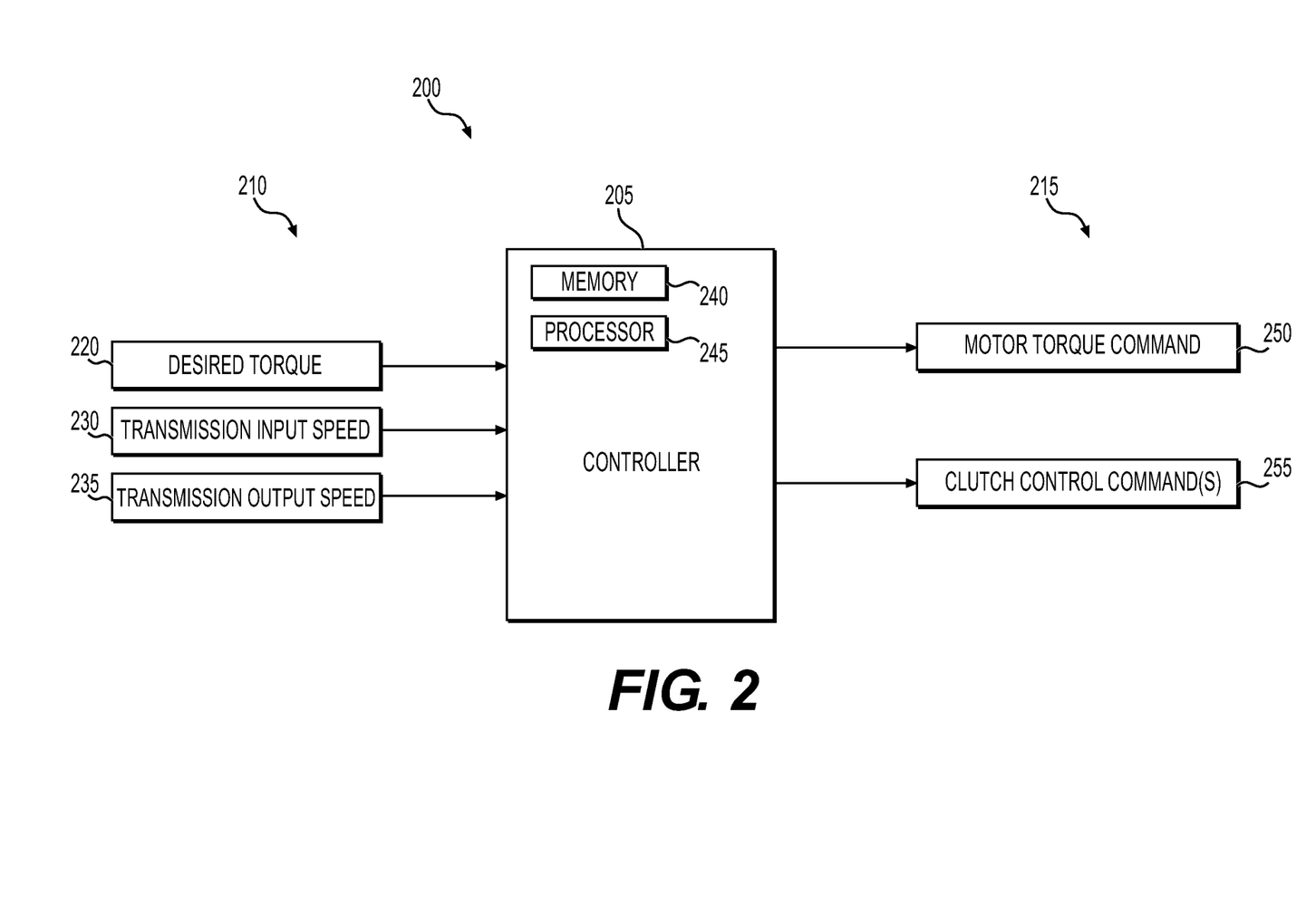
FIG. 2 shows a schematic drawing of the motor controller, which may be installed within the wheel loader shown in FIG. 1, which may be used to store instructions for and carry out the method in accordance with the present disclosure.

Referring to FIGS. 1 and 2 drivetrain control system 200 may include a controller 205 receiving various inputs 210 from, and providing various outputs 215 to, electric drivetrain 105. For example, controller 205 may receive a desired torque request signal 220 from, for example, an operator in operator station 150. This desired torque request signal 220 may correspond to a motive request from the operator and is also known as a non-shifting torque request. Controller 205 of the drivetrain control system 200 may also receive transmission input speed signals 230 and transmission output speed signals 235 corresponding to the speed of the input and output shafts, respectively, of the multi-speed transmission 115. The transmission input speed signals 230 and transmission output speed signals 235 may be provided by appropriate real or virtual sensors, such as speed sensors 155 and 160, respectively (FIG. 1).

Drivetrain control system 200 may provide outputs from controller 205 in the form of a motor torque command 250 that controls the torque output from electric motor 110. The motor torque commands 250 may include non-shifting motor torque commands when gear shifting is not required, and may include synchronizing motor torque commands during shifting, as will be discussed in more detail below. Additionally, controller 205 may provide clutch control commands 255 for controlling one or both clutches 130, 135, as is known in the art.

Controller 205 may include memory 240 and one or more processors 245. The memory 240 or secondary storage device associated with controller 205 may store data and/or software routines that may assist controller 205 in performing its functions, such as the functions of method 300 of FIG. 3 and method 315 of FIG. 4. Further, the memory or secondary storage device associated with controller 205 may also store data received from the various inputs 210 associated with electric drivetrain 105. Numerous commercially available microprocessors can be configured to perform the functions of controller 205. It should be appreciated that controller 205 could readily embody a general machine controller capable of controlling numerous other machine functions. Alternatively, a special-purpose machine controller could be provided. Various other known circuits may be associated with controller 205, including signal-conditioning circuitry, communication circuitry, hydraulic or other actuation circuitry, and other appropriate circuitry.

INDUSTRIAL APPLICABILITY

The system and methods of the present disclosure find applicability in electric drivetrains 105 having multi-speed transmissions 115. In particular, the present disclosure finds applicability in the control of a traction motor 110 of an electric drivetrain 105 to assist in the switching of gears of the multi-speed transmission 115 to help avoid detrimental high temperatures and wear of components of multi-speed transmission 115.

During operation of machine 100, the multi-speed transmission 115 receives an instruction for shifting of gears based on, for example, a desired motive torque request signal 220 from an operator of machine 100 in the operator station 150. The gear shifting instructions may be determined automatically, as is the case for an automatic transmission, or manually, from an operator of the machine 100. The instruction for shifting of gears may include an upshift of the multi-speed transmission 115, or a downshift of the multi-speed transmission 115. Control of the electric traction motor 110 may be based on the instruction for the shifting of gears, as discussed in more detail below.

Figure 3:
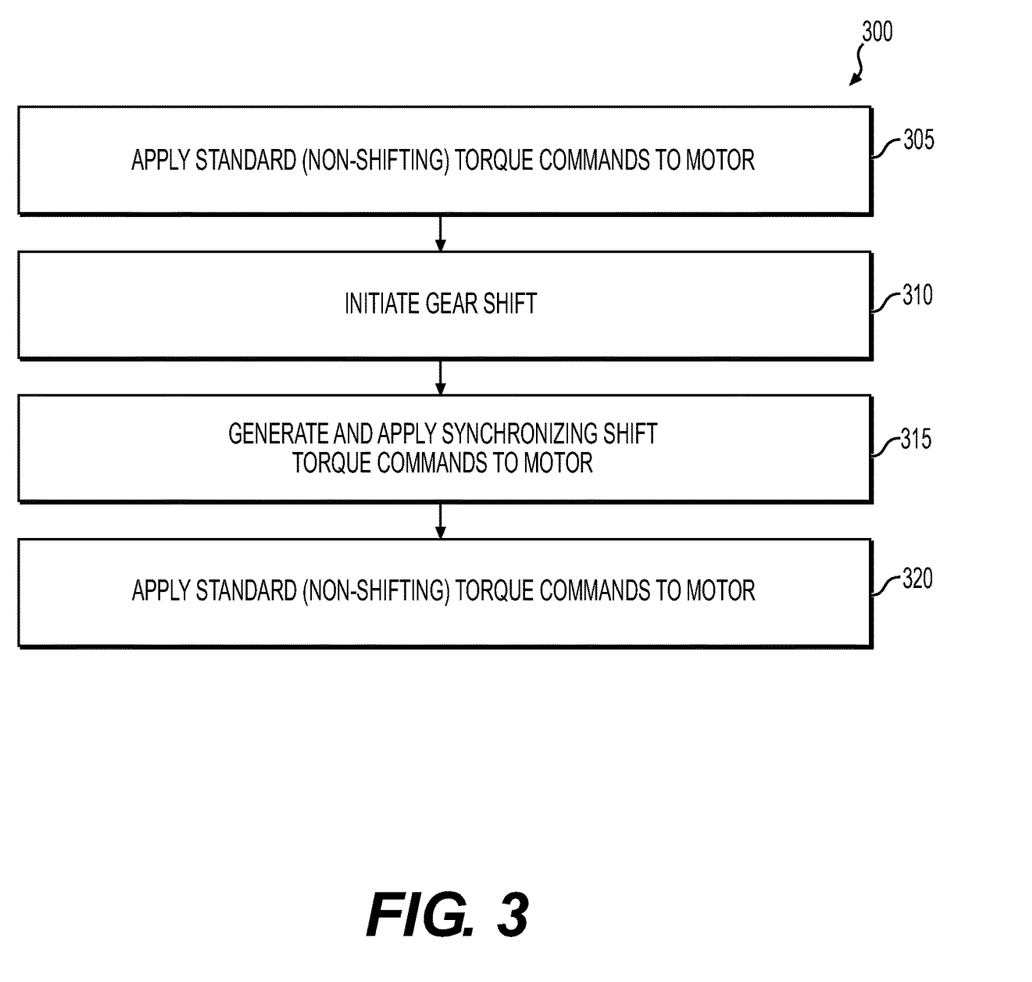
FIG. 3 is a flowchart showing a method for controlling a motor of the electric drivetrain of the machine, such as the wheel loader shown in FIG. 1, in accordance with the present disclosure.

FIG. 3 is a flowchart showing a method for controlling a motor of an electric drivetrain 105 having a multi-speed transmission 115 with at least a first clutch 130 and a second clutch 135. The method may include a step 305 of applying standard motor torque (or non-shifting motor torque commands) 250 during operation of the multi-speed transmission 120 when the multi-speed transmission 115 is in a particular gear corresponding to clutches 130, 135 either fully engaged or disengaged. The method may also include step 310 of initiating a shift of gears. As noted above, the initiating of the shift of gears may be performed automatically or manually. The method 300 may also include a step 315 of generating and applying synchronizing shift torque commands to the traction motor 110 based on an operating or clutch engagement parameter of the multi-speed transmission 115 until the gear shift is complete. The step 315 of generating and applying synchronizing torque commands 250 to the motor 110 is discussed in more detail below with respect to FIGS. 4 and 5. The method 300 may also include a step 320 of applying standard or non-shifting motor torque commands 250 to the motor 110, as in step 305, once the gear shift is complete—corresponding to fully engaged/disengaged clutches 130, 135. Although the method 300 is described as including steps 305 to 320, the method may include a subset of these steps, such as steps 305 to 315 only, steps 310 and 315 only, steps 310 to 320 only, or other combinations.

The steps 310 and 315 of method 300 are performed during a gear shift process of multi-speed transmission 115 of machine 100, and is therefore integrated with control of the clutches and other components of the multi-speed transmission 115, and performed as part of other methods that may be performed by one or more control systems of the machine 100.

Figure 4:
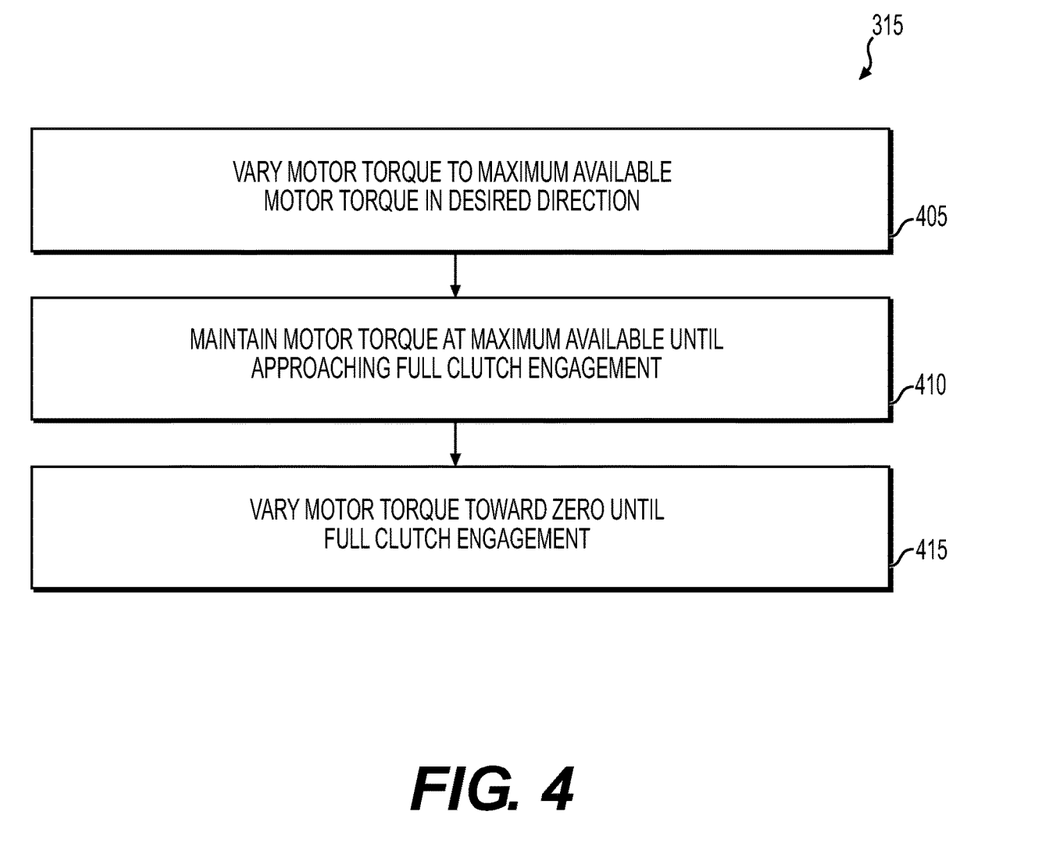
FIG. 4 is a flowchart showing additional steps of the method shown in FIG. 3, in accordance with the present disclosure.
Figure 5:
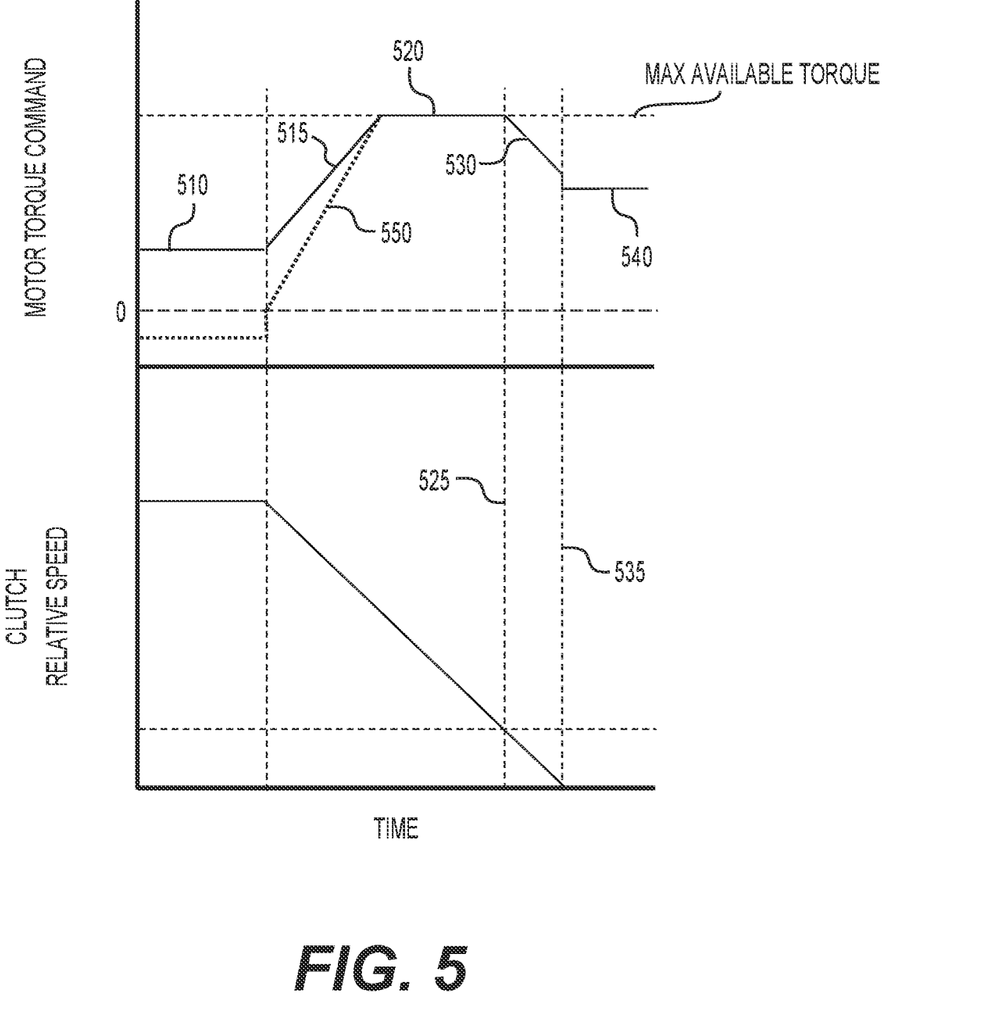
FIG. 5 provides motor torque command and transmission relative speed charts to illustrate the methods of the present disclosure.

FIGS. 4 and 5 show additional details of the step 315 of generating and applying synchronizing torque commands 250 to the traction motor 110 based on the operating parameters of the multi-speed transmission 115 until the gear shift is complete. In the example operation charted in FIG. 5, an upshift is exemplified. It is understood that a downshift would operate in the same manner, but with opposite signs (positive vs. negative) for the motor torque command 250. Further, the example of FIG. 5 assumes that the non-shifting torque command 250 applied to motor 110 prior to shifting, and the synchronizing shift torque commands 250 applied to motor 110 during shifting, are the same sign, both positive as shown in FIG. 5.

As noted above, prior to applying a synchronizing shift torque command 250 to motor 110, a standard, non-shifting torque command is applied to motor 110 (step 305). This standard, non-shifting motor torque command 250 is depicted as 510 in FIG. 5. Referring back to FIG. 4, application of the synchronizing shift torque commands 250 to motor 110 may include a step 405 of varying the motor torque command 250 to a maximum available motor torque. The varying of the motor torque command 250 to a maximum available motor torque may be applied in a step-wise manner or in a ramp-type or linear manner, and is depicted in a ramp-type/linear manner 515 in FIG. 5. This ramping to a maximum available motor torque 515 may be characterized as a "ramp-on." As noted above, the direction of this "ramp-on" (positive or negative) is dependent upon whether the shifting is an upshifting as shown, or a downshifting (not shown).

In step 410, the motor torque command 250 is maintained at the maximum available motor torque (520 in FIG. 5) until the particular clutch 130, 135 approaches full engagement. In one example, drivetrain control system 200 may determine when a clutch 130, 135 is approaching full engagement by monitoring the transmission input speed 230 and transmission output speed 235 via speed sensors 155 and 160, respectively (FIG. 1). Transmission input speed 230 and transmission output speed 235 may be used to calculate a clutch relative speed, and when the clutch relative speed approaches zero, the clutch approaches full engagement. While other values may be used, controller 205 may be programmed to identify an approaching full clutch engagement as when the transmission input speed 230 and transmission output speed 235 only vary by 10% when ratios are accounted for. This predetermined "approaching" full clutch engagement is shown as vertical line/time 525 in FIG. 5. It is understood approaching full clutch engagement may be identified in other ways than with clutch relative speed. Further, it is noted that maintaining maximum available motor torque is depicted as a straight horizontal line 520 in FIG. 5, but it is understood that the maximum available torque of motor 110 may vary based on system conditions, and thus line 520 may or may not be a straight horizontal line.

Once controller identifies that a clutch full engagement is approaching, the motor torque command is varied toward zero (step 415). Similar to step 405, the varying of the motor torque command 250 toward zero may be applied in a step-wise manner or in a ramp-type manner, and is depicted in a ramp-type or linear manner 530 in FIG. 5. This ramping of the motor torque command 250 toward zero may be characterized as a "ramp-off." This varying of the motor torque command 250 toward zero may continue until full engagement of the clutch 130, 135, e.g., the transmission relative speed is zero (time 535 in FIG. 5). At this point, a new standard non-shifting torque command 250 is applied to the motor 110 corresponding to the new gear of the multi-speed transmission 115. This corresponds to step 320 of FIG. 3, and is shown by horizontal line 540 in FIG. 5. However, in some "atypical" shifts, the transmission relative speed may not be zero when the motor ramp off is complete (i.e., when the ramp off torque command equals the appropriate torque command 250 for the new gear (line 540 in FIG. 5). In this situation, the motor torque command 250 will be held steady at the torque command for the new gear 540 until full clutch engagement, e.g., the transmission relative speed is zero. Thereafter the standard non-shifting torque command 250 may be varied based on operator desired torque or other system conditions. Further, if the new gear motor torque command (line 450) is negative, the torque command 250 will be held steady at zero until full clutch engagement, and then move to the non-shifting torque command 250.

It is noted that in some instances, the initial standard non-shifting torque command torque command (510 in FIG. 5) may be an opposite sign than the maximum available torque 520. In such instances an additional control step is included corresponding to adjusting the motor torque command to zero before staring the ramp-up to the maximum available torque. This is shown in dotted line 550 in FIG. 5. The adjusting of the motor command may be done in a step manner or a ramp manner or in an alternative manner.

The drivetrain control system 200 described herein may assist in reducing high traction motor inertial loads on clutches 130, 135 during shifting. This can help reduce elevated temperatures and wear on the clutches 130, 135, and associated components of the electric multi-speed transmission. The methods and operations performed by the controller 205 may also assist in reducing time for dissipation of traction motor inertia while changing gears. In addition, by virtue of the clutch control provided herein, the system and methods manage the relatively greater size of electric motor inertia and, therefore, can implement the clutch control in an electric drivetrain 105 with a multi-speed transmission 115 and provide relatively greater torque output by the electric motor in machines, such as wheel loaders and motor graders.

It will be apparent to those skilled in the art that various modifications and variations can be made to the disclosed system and methods without departing from the scope of the disclosure. Other embodiments of the system and methods will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

We claim:

1. A method for controlling a motor of an electric drivetrain having a multi-speed transmission with at least a first clutch and a second clutch, the method comprising:
    initiating a transmission shift requiring engagement of the first clutch;
    applying synchronizing torque commands to the motor based on an engagement parameter of the first clutch until the shift is complete, the applying of the synchronizing torque commands to the motor including setting a motor torque command to zero and varying the motor torque command; and
    applying non-shifting torque commands to the motor after the shift is complete.

2. The method of claim 1, wherein the applying of the synchronizing torque commands to the motor includes varying the motor torque command to a maximum available motor torque during partial engagement of the first clutch.

3. The method of claim 2, wherein the varying of the motor torque command to a maximum available motor torque is done in a linear manner.

4. The method of claim 2, wherein the applying of the synchronizing torque commands to the motor further includes varying the motor torque command toward zero as the first clutch approaches full engagement.

5. The method of claim 4, wherein the varying of the motor torque command toward zero is initiated at a predetermined partial engagement of the first clutch.

6. The method of claim 5, further including holding steady the synchronizing torque command equal to a desired non-shifting torque command until the first clutch is fully engaged.

7. The method of claim 1, wherein the electric drivetrain is used on an all-electric mobile industrial machine, and the machine is driven only by the motor.

8. The method of claim 1, wherein the first and second clutches are hydraulic clutches.

9. A method for controlling a mobile industrial machine having an electric drivetrain including a traction motor and a multi-speed transmission having at least a first clutch and a second clutch, the method comprising:
    initiating a transmission shift requiring engagement of the first clutch;
    applying a motor torque command to a maximum available motor torque during partial engagement of the first clutch;
    varying, at a predetermined partial engagement of the first clutch, the motor torque command to zero as the first clutch approaches full engagement; and
    applying non-shifting torque commands to the motor after the shift is complete.

10. The method of claim 9, wherein the applying of the motor torque command to a maximum available torque is done in a ramp-up manner.

11. The method of claim 10, wherein the motor torque command is set to zero prior to the applying of the motor torque command to the maximum available torque.

12. The method of claim 10, further including holding steady the motor torque command equal to a desired non-shifting torque command until the first clutch is fully engaged.

13. The method of claim 9, wherein the first and second clutches are hydraulic clutches.

14. A system for controlling a motor of an electric drivetrain having a multi-speed transmission, the system comprising:
    the electric drivetrain having the multi-speed transmission with at least a first clutch and a second clutch;
    the motor; and
    a motor controller configured to perform operations including:
        applying synchronizing torque commands to the motor based on an engagement parameter of the first clutch during engagement of the first clutch; and
        applying non-shifting torque commands to the motor after a shift is complete.

15. The system of claim 14, wherein the applying of the synchronizing torque commands to the motor includes varying a motor torque command to a maximum available motor torque during partial engagement of the first clutch.

16. The system of claim 15, wherein the motor torque command is set to zero prior to the varying of the motor torque command to the maximum available torque.

17. The system of claim 15, wherein the applying of the synchronizing torque commands to the motor further includes varying a motor torque command toward zero as the first clutch approaches full engagement.

18. The system of claim 17, wherein the varying of the motor torque command toward zero is initiated at a predetermined partial engagement of the first clutch.

19. The system of claim 18, wherein the motor controller is further configured to perform an operation of holding steady the synchronizing torque command equal to a desired non-shifting torque command until the first clutch is fully engaged.

20. The system of claim 14, wherein the electric drivetrain is used on an all-electric mobile industrial machine, and the machine is driven only by the motor, and wherein the first and second clutches are hydraulic clutches.

* * * * *